(12) United States Patent
Agarwal et al.

(10) Patent No.: US 10,437,462 B2
(45) Date of Patent: Oct. 8, 2019

(54) METHOD FOR LOCKING AND UNLOCKING TOUCHSCREEN-EQUIPPED MOBILE DEVICE AND MOBILE DEVICE

(71) Applicant: SAMSUNG ELECTRONICS CO., LTD., Suwon-si, Gyeonggi-do (KR)

(72) Inventors: Pankaj Agarwal, Suwon-si (KR); Sameer Kumar Agrawal, Suwon-si (KR); Parichay Kapoor, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 257 days.

(21) Appl. No.: 15/293,757

(22) Filed: Oct. 14, 2016

(65) Prior Publication Data
US 2017/0109035 A1     Apr. 20, 2017

(30) Foreign Application Priority Data
Oct. 15, 2015 (KR) .......................... 10-2015-0144228

(51) Int. Cl.
*G06F 21/00* (2013.01)
*G06F 3/0488* (2013.01)
(Continued)

(52) U.S. Cl.
CPC ........ *G06F 3/04883* (2013.01); *G06F 3/0481* (2013.01); *G06F 3/0482* (2013.01);
(Continued)

(58) Field of Classification Search
CPC ...... G06F 3/0488; G06F 3/0481; G06F 3/017; G06F 3/0486; G06F 21/629; G06F 21/32;
(Continued)

(56) References Cited

U.S. PATENT DOCUMENTS 9,111,076 B2 *   8/2015   Park ...................... G06F 3/0412
9,245,101 B2 *   1/2016   Zhou ................... G06F 3/04883
(Continued)

FOREIGN PATENT DOCUMENTS

| AU | 2011101192 | 10/2011 | |
| CN | 104200141 B * | 6/2017 | ............. G06F 21/31 |

(Continued)

OTHER PUBLICATIONS

Extended Search Report dated May 28, 2018 in counterpart European Patent Application No. 16855786.6.
(Continued)

*Primary Examiner* — Don G Zhao
(74) *Attorney, Agent, or Firm* — Nixon & Vanderhye P.C.

(57) ABSTRACT

The present disclosure relates generally to technologies for sensor networks, machine-to-machine (M2M), machine-type communication (MTC), and Internet of things (IoT). The present disclosure may be used in intelligent services (smart home, smart building, smart city, smart car, or connected car, health-care, digital education, retail business, security and safety-related services, etc.), or the like, without limitation. According to the present disclosure, a method for locking a device comprises displaying a screen requesting selection of an image category for a lock screen when an input corresponding to a lock request through a display unit supporting a touch input is detected; displaying a screen requesting setting a password for unlocking when an input corresponding to the selection of the image category is detected; and selecting images supporting the password setting among images included in the selected image category into a group when an input corresponding to the password setting is detected, and locking the touch input to the display unit by displaying one of the selected images.

12 Claims, 15 Drawing Sheets

(51) Int. Cl.
   *G06F 3/0481* (2013.01)
   *G06F 3/0482* (2013.01)
   *G06F 21/36* (2013.01)
   *G06F 21/60* (2013.01)

(52) U.S. Cl.
   CPC ............ *G06F 21/36* (2013.01); *G06F 21/604* (2013.01); *G06F 2221/2133* (2013.01)

(58) Field of Classification Search
   CPC ................ G06F 3/04883; G06F 21/36; G06F 2221/2137; G06F 3/0482; G06F 21/604; G06F 2221/2133; H04M 1/67; H04M 2250/22
   See application file for complete search history.

(56) References Cited

U.S. PATENT DOCUMENTS

| | | | |
|---|---|---|---|
| 9,430,144 B1* | 8/2016 | Alsvig | H04W 12/06 |
| 2010/0162182 A1 | 6/2010 | Oh et al. | |
| 2011/0121654 A1* | 5/2011 | Recker | H02J 9/065 307/66 |
| 2013/0057496 A1* | 3/2013 | Hong | G06F 3/0488 345/173 |
| 2013/0094770 A1* | 4/2013 | Lee | G06F 21/36 382/218 |
| 2013/0111379 A1* | 5/2013 | Hong | G06F 3/04883 715/764 |
| 2013/0135226 A1* | 5/2013 | Ho | G06F 3/04883 345/173 |
| 2013/0167053 A1 | 6/2013 | Kwak et al. | |
| 2013/0317087 A1 | 11/2013 | Maquat et al. | |
| 2014/0038562 A1 | 2/2014 | Kawabata | |
| 2014/0058941 A1* | 2/2014 | Moon | G06Q 20/322 705/42 |
| 2014/0092039 A1* | 4/2014 | Ito | G06F 21/36 345/173 |
| 2014/0189523 A1* | 7/2014 | Shuttleworth | G06F 3/0484 715/741 |
| 2014/0245432 A1* | 8/2014 | Zhou | G06F 3/04883 726/19 |
| 2014/0289843 A1* | 9/2014 | Chiang | G06F 3/04883 726/19 |
| 2014/0317499 A1* | 10/2014 | Oh | G06F 3/04815 715/702 |
| 2014/0317723 A1* | 10/2014 | Hicks | G06F 21/36 726/19 |
| 2014/0317724 A1* | 10/2014 | Hicks | G06F 21/36 726/19 |
| 2014/0344918 A1* | 11/2014 | Choi | G06F 21/88 726/16 |
| 2015/0042454 A1* | 2/2015 | Lee | G07C 9/00182 340/5.72 |
| 2015/0082252 A1 | 3/2015 | Chaudhri et al. | |
| 2015/0128255 A1* | 5/2015 | Kuscher | G06F 3/16 726/19 |
| 2015/0156313 A1 | 6/2015 | Zeng et al. | |
| 2015/0193139 A1* | 7/2015 | Kaptelinin | G06F 3/04883 715/863 |
| 2015/0212640 A1* | 7/2015 | Fang | G06F 3/0488 345/173 |
| 2015/0245210 A1* | 8/2015 | Kwon | G06F 21/36 455/411 |
| 2016/0006862 A1* | 1/2016 | Park | H04M 1/72577 455/411 |
| 2017/0115736 A1* | 4/2017 | Patel | G06F 3/017 |
| 2017/0249003 A1* | 8/2017 | Nonogaki | G06F 1/1613 |
| 2018/0373901 A1* | 12/2018 | Wang | G06F 1/1626 |

FOREIGN PATENT DOCUMENTS

| | | |
|---|---|---|
| EP | 2 738 706 | 6/2014 |
| KR | 10-2013-0093720 | 8/2013 |
| WO | 2013/094909 | 6/2013 |

OTHER PUBLICATIONS

Search Report and Written Opinion dated Jan. 26, 2017 in counterpart International Patent Application No. PCT/KR2016/011580.

* cited by examiner

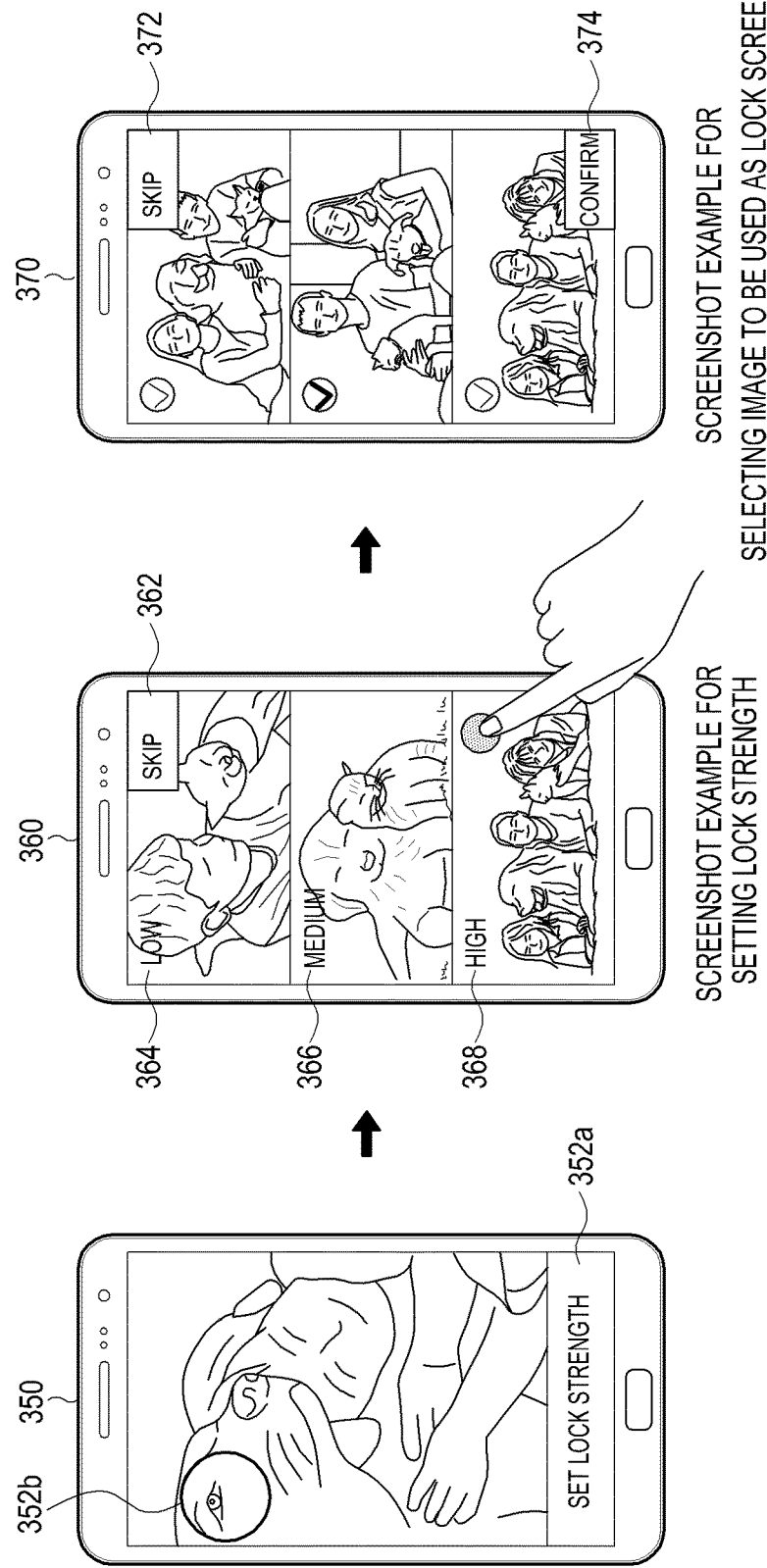

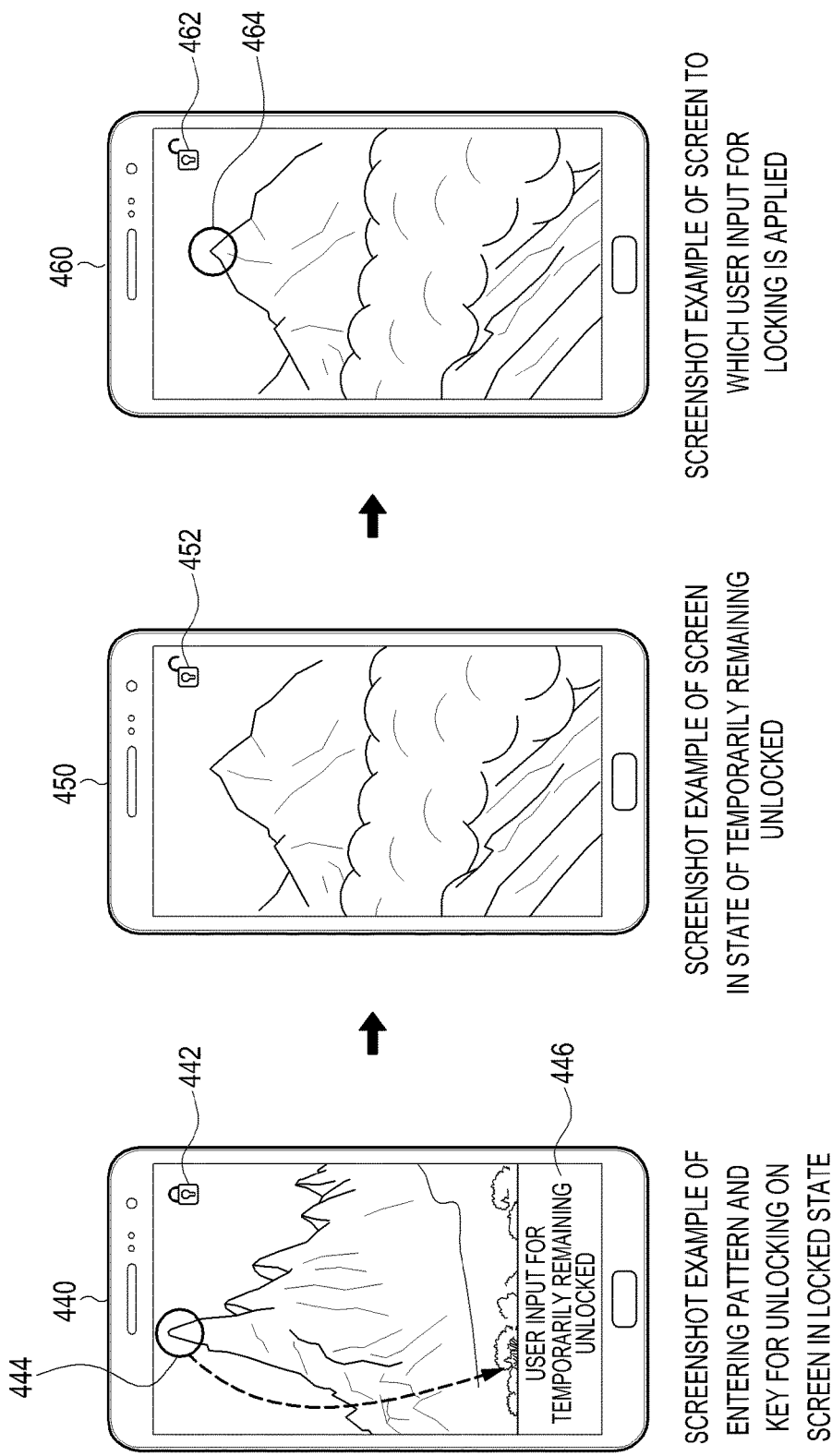

METHOD FOR LOCKING AND UNLOCKING TOUCHSCREEN-EQUIPPED MOBILE DEVICE AND MOBILE DEVICE

CROSS-REFERENCE TO RELATED APPLICATION

This application is based on and claims priority under 35 U.S.C. § 119 to a Korean patent application filed in the Korean Intellectual Property Office on Oct. 15, 2015 and assigned Serial No. 10-2015-0144228, the disclosure of which is incorporated by reference herein in its entirety.

TECHNICAL FIELD

The present disclosure relates generally to methods for locking and unlocking touchscreen-equipped mobile devices and mobile devices.

DISCUSSION OF RELATED ART

The Internet is evolving from the human-centered connection network by which humans create and consume information to an Internet of Things (IoT) network by which information is communicated and processed between things or other distributed components. The Internet of Everything (IoE) technology may be an example of a combination of Big data processing technology and IoT technology through, e.g., a connection with a cloud server.

To implement the IoT, technology elements, such as a sensing technology, wired/wireless communication and network infrastructure, service interface technology, and a security technology, are required. There is a recent ongoing research for inter-object connection technologies, such as the sensor network, Machine-to-Machine (M2M), or the Machine-Type Communication (MTC).

In the IoT environment intelligent Internet Technology (IT) services that collect and analyze the data generated by the things connected with one another may be offered to create human life a new value. The IoT may have various applications, such as the smart home, smart building, smart city, smart car or connected car, smart grid, health-care, or smart appliance industry, or state-of-art medical services, through conversion or integration of existing IT technologies and various industries.

A representative electronic device used upon implementing the IoT may be a portable terminal capable of voice call and information exchange. A sharp growth of the portable terminal has led to the development of the smartphone, and touchscreen technology has applied to the portable terminal for easier user manipulation.

A touchscreen-equipped portable terminal typically has a touch lock function implemented to prevent touch malfunctions. A representative, relatively simple implementation of a touch lock function is to sense the user's password or input pattern to release the touch lock.

As the smartphone is introduced, and the portable terminal happens to support functions operated based on the user's critical personal information on top of simple communication functionality, a security-enhanced locking function is needed.

The above information is presented as background information only to assist with an understanding of the present disclosure. No determination has been made, and no assertion is made, as to whether any of the above might be applicable as prior art with regard to the present disclosure.

SUMMARY

According to the present disclosure, a method for locking and unlocking a touchscreen-equipped mobile device and the mobile device are proposed.

According to an example embodiment of the present disclosure, a method for locking a device comprises displaying a screen requesting selection of an image category for a lock screen when an input corresponding to a lock request through a display unit supporting a touch input is detected; displaying a screen requesting setting a password for unlocking when an input corresponding to the selection of the image category is detected; and selecting images supporting the password setting among images included in the selected image category into a group when an input corresponding to the password setting is detected, and locking the touch input to the display unit by displaying one of the selected images.

According to an example embodiment of the present disclosure, a method for unlocking a device comprises identifying whether locking a touch input to a display is set when an input is detected through the display; displaying one of images included in a stored image category for a lock screen on a screen when the locked state is set; unlocking when an input corresponding to a password for unlocking on an image of the screen is detected; displaying a screen requesting a password for temporarily remaining unlocked when the input corresponding to the password is not detected; and switching to a temporarily-remaining-unlocked state when an input corresponding to the password for temporarily remaining unlocked is detected.

According to an example embodiment of the present disclosure, a device comprising a display unit to support a touch input; and a controller configured to control the display unit to display a screen requesting selection of an image category for a lock screen when an input corresponding to a request to lock through the display is detected, to control the display unit to display a screen requesting setting a password for unlocking when an input corresponding to the selection of an image category is detected, and to select images supporting the password setting among images included in the selected image category into a group when an input corresponding to the password setting is detected, and to lock the touch input to the display unit by displaying one of the selected images. According to an example embodiment of the present disclosure, a device comprises a display unit to support a touch input; and when an input is detected through the display unit, a controller configured to identify whether locking a touch input to a display is set when an input is detected through the display unit, when the locked state is set, control the display unit to display images included in a stored image category for a lock screen on a screen, unlock the device when an input corresponding to a password for unlocking on an image of the screen is detected, control the display unit to display a screen requesting a password for temporarily remaining unlocked when the input corresponding to the password is not detected, and to switch to a temporarily-remaining-unlocked state when an input corresponding to the password for temporarily remaining unlocked is detected.

Other aspects, advantages, and example features of the present disclosure will be apparent to one of ordinary skill in the art from the following detailed description taken in conjunction with the accompanying drawings and disclosing example embodiments of the present disclosure.

Prior to going into the detailed description of the disclosure, it might be effective to discuss the use of particular words and phrases used herein. As used herein, the terms "include" and "comprise" and their derivatives may refer, for example, to doing so without any limitations. As used herein, the term "or" may include "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of" As used herein, the term "controller" may refer, for example, to any device, system, or part thereof controlling at least one operation. As used herein, the term "device" may be implemented in hardware (e.g., circuitry), firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

Other aspects, advantages, and salient features of the disclosure will become apparent to those skilled in the art from the following detailed description, which, taken in conjunction with the annexed drawings, discloses embodiments of the disclosure.

BRIEF DESCRIPTION OF THE DRAWINGS

Various aspects, advantages, salient features, and the like, will be become more apparent from the following detailed description, taken in conjunction with the accompanying drawings, in which like reference numerals refer to like elements, and wherein:

FIG. 3C is a diagram illustrating example screenshots of a mobile device for setting a lock strength in a mode for temporarily remaining unlocked according to an example embodiment of the present disclosure;

FIGS. 4C and 4D are diagrams illustrating example screenshots of a mobile device corresponding to operations as illustrated in FIGS. 4A and 4B according to an example embodiment of the present disclosure;

DETAILED DESCRIPTION

Figure 1A:
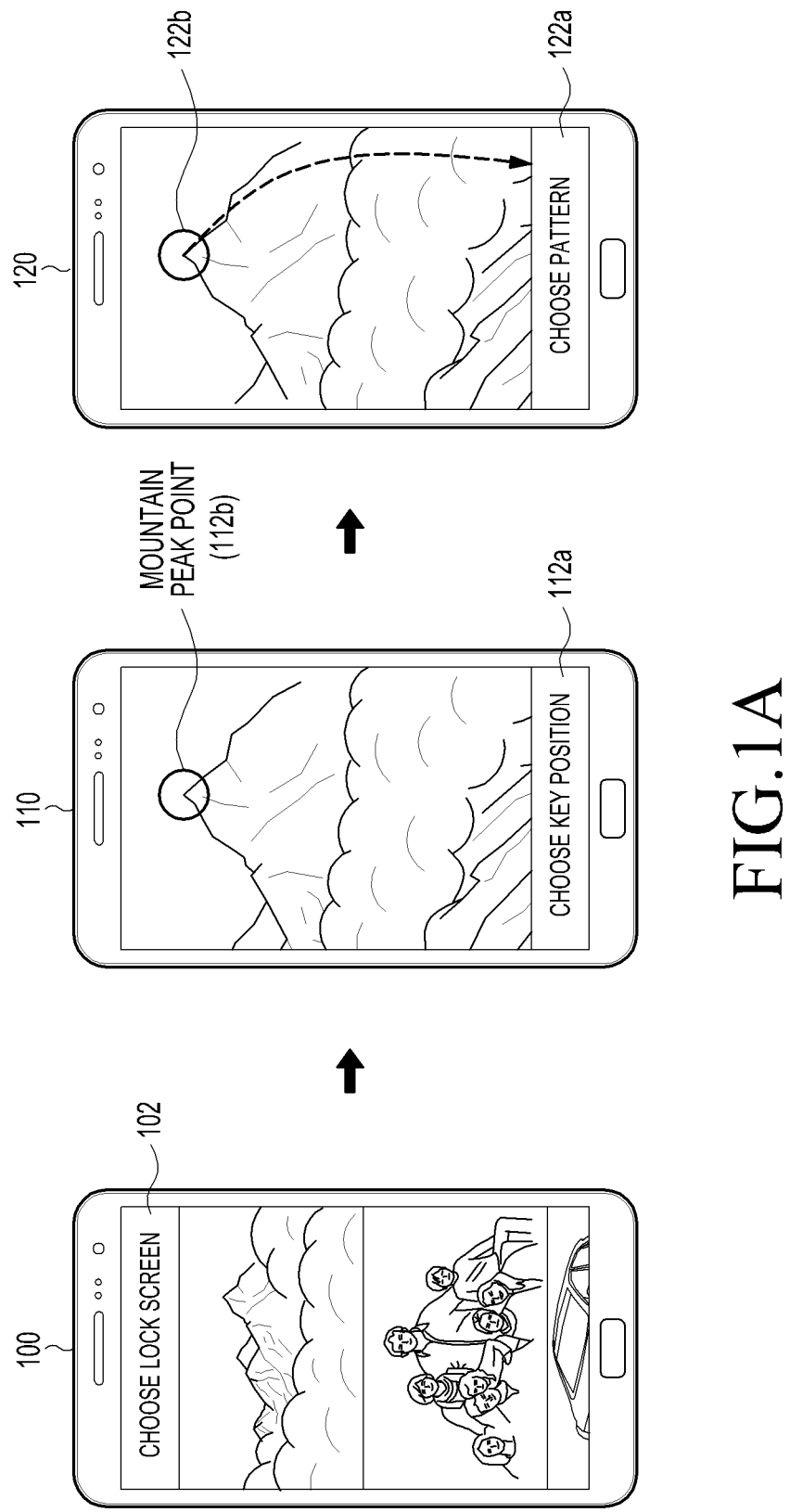
FIG. 1A is a diagram illustrating an example of an operation of setting a password for unlocking based on an image for a locking function of a mobile device according to an example embodiment of the present disclosure.

Hereinafter, example embodiments of the present disclosure are described in greater detail with reference to the accompanying drawings. The same reference numerals are used to refer to same or similar elements throughout the drawings. When determined to make the subject matter of the present disclosure unclear, the detailed of the known functions or configurations may be omitted. The terms as used herein are defined considering the functions in the present disclosure and may be replaced with other terms according to the intention or practice of the practitioner or operator. Therefore, the terms should be defined based on the overall disclosure.

Various changes may be made to the present disclosure, and the present disclosure may come with a diversity of example embodiments. Some example embodiments of the present disclosure are illustrated and described in connection with the drawings. However, it should be appreciated that the present disclosure is not limited to the example embodiments, and all changes and/or equivalents or replacements thereto also belong to the scope of the present disclosure.

As used herein, the singular forms "a," "an," and "the" are intended to include the plural forms as well, unless the context clearly indicates otherwise. Accordingly, as an example, a "component surface" includes one or more component surfaces.

Terms using ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided simply to describe various example embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined in connection with example embodiments of the present disclosure, all terms including technical and scientific terms used herein have the same meaning as commonly understood by one of ordinary skill in the art to which the example embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an example embodiment of the present disclosure, an electronic device as disclosed herein may include a communication function. For example, the electronic device may be a smartphone, a tablet PC, a personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD)), electronic clothes, an electronic bracelet, an electronic necklace, an electronic appcessory, an electronic tattoo, or a smart watch, or the like, but is not limited thereto.

According to various example embodiments of the disclosure, the electronic device may be a smart home appliance with a communication function. For example, the smart home appliance may be a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™, a gaming console, an electronic dictionary, a camcorder, or an electronic picture frame, or the like, but is not limited thereto.

According to various example embodiments of the disclosure, the electronic device may be a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), an aviation electronic device, a security device, or a robot for home or industry, or the like, but is not limited thereto.

According to various example embodiments of the disclosure, the electronic device may be a piece of furniture with a communication function, part of a building/structure, an electronic board, an electronic signature receiving device, a projector, or various measurement devices (e.g., devices for measuring water, electricity, gas, or electromagnetic waves), or the like, but is not limited thereto.

According to various example embodiments of the disclosure, an electronic device may be a combination of the above-listed devices. It should be appreciated by one of ordinary skill in the art that the electronic device is not limited to the above-described devices.

According to an example embodiment of the present disclosure, the mobile device may be, for example, an electronic device.

An example method for locking and unlocking a touchscreen-equipped mobile device according to an example embodiment of the present disclosure will now be described in greater detail below. The mobile device according to an example embodiment of the present disclosure includes any device having a touchscreen and capable of receiving inputs, e.g., user inputs including, for example, a predetermined count of clicks, touches, drags, or pushes, or other user actions, entered through the touchscreen.

For example, according to an example embodiment of the present disclosure, a locking function may be set based on an image database (DB) stored in the mobile device. According to an example embodiment of the present disclosure, each image stored in the image DB is stored, mapped with metadata containing characteristic information about the image. For example, the metadata may include, e.g., names of entities present in the image and information on positions of the entities. According to an example embodiment of the present disclosure, in order to obtain the metadata for each image, a program for identifying the entities included in the image may be obtained and stored from a third party network or communication network server or may be set as default in the mobile device. When the program is run on the images stored in the image DB of the mobile device, metadata may be generated per image, mapped to its corresponding image, and stored with the corresponding image.

According to an example embodiment of the present disclosure, such a locking function may be supported such that security levels may stepwise be supported by stepwise setting, a key position, password, or pattern configured by the user. A state in which the user's mobile device temporarily remains unlocked, which is also referred to herein as "temporarily-remaining-unlocked state" is also disclosed. For example, when the user is an office worker who works stationary in the office, the user is relatively less likely to contact the mobile device. Under such a specific circumstance, the user avoid unnecessarily locking the mobile device for his working time by setting the temporarily-remaining-unlocked state. According to an example embodiment of the present disclosure, a security level may be set based on metadata of images.

FIG. 1A is a diagram illustrating an example of an operation of setting a password for unlocking based on an image for a locking function of a mobile device according to an example embodiment of the present disclosure.

Referring to FIG. 1A, the user may access the image DB stored in the mobile device or a server and download new images therefrom, and the user may set a password for unlocking based on the downloaded new images. In this example, the user is assumed to run a menu for locking on the mobile device. Then, the mobile device fetches images in the image DB stored in the mobile device or new images downloaded from the server and displays the images on the screen 100 of the mobile device. In this example, the images may be classified based on the above-described metadata into image categories each having the same characteristic. For example, the images may be classified into a category including wallpaper images or scenery pictures, a family category including family photos, and a category including illustration images.

Among the images displayed on the mobile device screen 100, a particular image may be selected as an image for setting a password for unlocking (hereinafter, referred to as a "lock screen image"). As an example, an image including a mountain peak may be selected. According to an example embodiment of the present disclosure, lock screen images with a common characteristic for setting a password for unlocking may be bundled into a group (hereinafter, referred to as a "lock screen image group"). Such a setting may be made that whenever a locking function is run on the mobile device, one of the images included in the lock screen image group may be displayed arbitrarily or based, for example, on an order set by the user.

A lock screen image including a mountain peak may, for example, be displayed on the screen 110 of the mobile device. In this example, a popup window or message 112a requesting an input, such as, for example, a user input corresponding to the password setting for unlocking, along with the lock screen image, may be displayed on the screen 110 of the mobile device, with the popup window or message 112a overlapping the lock screen image 110. Although the screen 110 is so illustrated showing that the popup window or message 112a is positioned under the lock screen image as an example, the popup window or message 112a may alternatively be located at another position based, for example, on the user's previous setting or may be moved corresponding to a user input on the screen 110. The movement may control such situation that the popup window or message 112a interrupts the user input for setting the user's password.

Upon identifying the popup window or message 112a, the user may set a password for unlocking in the lock screen image. According to an example embodiment of the present disclosure, the password setting may be configured to include at least two steps. For example, the password setting may include the step of selecting a key position in such a manner as to select a particular entity on the image, the step of entering a particular pattern on the image, and the step of entering an answer to a predetermined question. The steps may stepwise be performed depending on predetermined lock strengths or the same number of steps may be performed regardless of order. Referring to FIG. 1A, a two-step password setting is illustrated as an example and for convenience of explanation. For example, a particular position in the lock screen image on the screen 110 is assumed to be selected as a key position for unlocking. Accordingly, the user may be assumed to select a point 112b corresponding to a mountain peak as the key position in the image including the mountain peak. The user input corresponding to the selection may be set as a touch or click. Or, according to an example embodiment of the present disclosure, a pattern or question based on information included in the image may be set as the password.

When the mobile device senses an input, e.g., a user input corresponding to the selection of the key position for the lock screen image, the mobile device may display a screen 120 for setting a next step for the password setting. According to an example embodiment of the present disclosure, a password setting may be made to include, for example, two steps for unlocking in order to enhance security for the locking function of the mobile device. FIG. 1A illustrates an example in which two steps of setting a key position and pattern are configured. A popup window or message 122a requesting the user to enter a user input corresponding to a pattern, along with the lock screen image, is displayed on the screen 120. The popup window or message 122a may also be configured to be located at another position based on the user's prior setting and may be moved corresponding to a user input on the screen 120. When identifying the popup window or message 122a, the user may enter a pattern for the password setting, e.g., a pattern of dragging down from the mountain peak point 122b. For example, for ease of description, such a situation is exemplified where the same image is used in setting the key position and pattern for password setting. According to an example embodiment of the present disclosure, however, the key position and pattern may be set for another image of the same category in the lock screen image group as described above, and such setting may be made so that the key position is associated with the pattern or not.

Figure 1B:
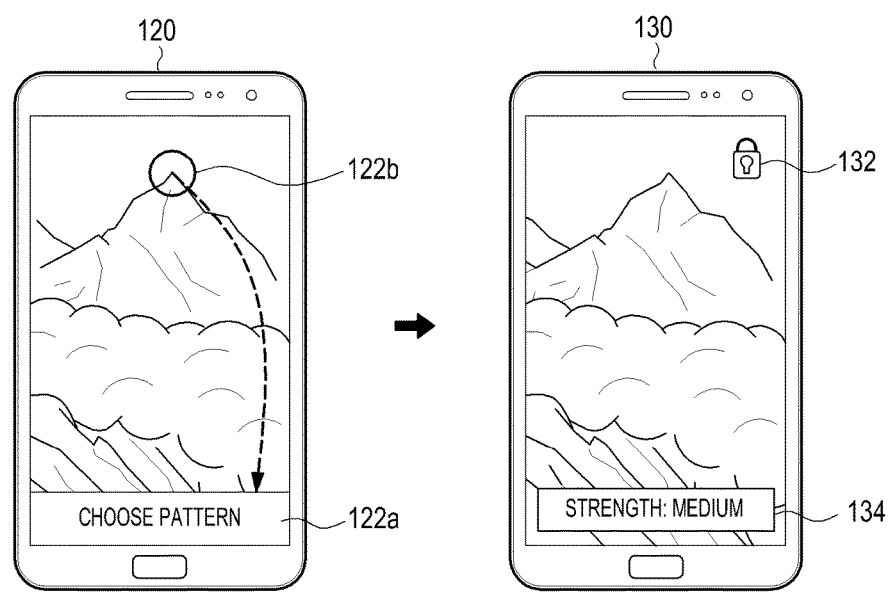
FIG. 1B is a diagram illustrating an example of an operation of setting a password for temporarily remaining locked based on an image for a locking function of a mobile device according to an example embodiment of the present disclosure.

FIG. 1B is a diagram illustrating an example of an operation of setting a password for temporarily remaining locked based on an image for a locking function of a mobile device according to an example embodiment of the present disclosure.

Referring to FIG. 1B, a password setting may, for example, be made in two steps for temporarily remaining unlocked like it is when the mobile device is unlocked. In this example, after selecting a pattern on the screen 120, a strength may be selected through a screen 130 as a next step for the password setting for temporarily remaining unlocked. For example, the strength may be divided into, e.g., high, medium, and low. Although not illustrated in the drawings, a popup window or message requesting a user input corresponding to the strength, along with the image for temporarily remaining unlocked, may be displayed on the screen 130. Reference number 134 denotes an example in which a "medium" is entered as an example of the corresponding user input. According to an example embodiment of the present disclosure, for images included in the image DB, per-category images may be stored which are obtained by categorizing images matching strengths based on the metadata of each image. According to an example embodiment of the present disclosure, a lock strength may flexibly be selected by the user depending on situations. When the user's position is considered as an example of such situation, e.g., when the user is at home, the strength may be set to low, when the user is on trip, the strength may be set to medium, and when the user attends a Friday night party, the strength may be relatively increased and set to high.

The closed lock shape 132 on the screen 130 is an example of a state indication icon indicating that the locking function of the mobile device is currently maintained. According to an example embodiment of the present disclosure, as the state indication icon, the user may arbitrarily select one of the images included in the image DB or access a server providing the images and set a desired one of the images as the state indication icon. According to an example embodiment of the present disclosure, an additional password setting step may be performed per strength for password setting. For example, when a three-step password setting is made as described above, the password setting may step up one by one as the strength increases. For example, when the strength is set to "low," the password setting for temporarily remaining unlocked may be configured to include only the step of setting a key position, and when the strength is set to "medium," the password setting may be configured to further include the step of setting a pattern in addition to a key position. When the strength is set to "high," the password setting may be configured to further include the step of setting a "question" previously selected by the user. Alternatively, the complexity of the image or question may be increased per strength for the password setting.

Figure 2A:
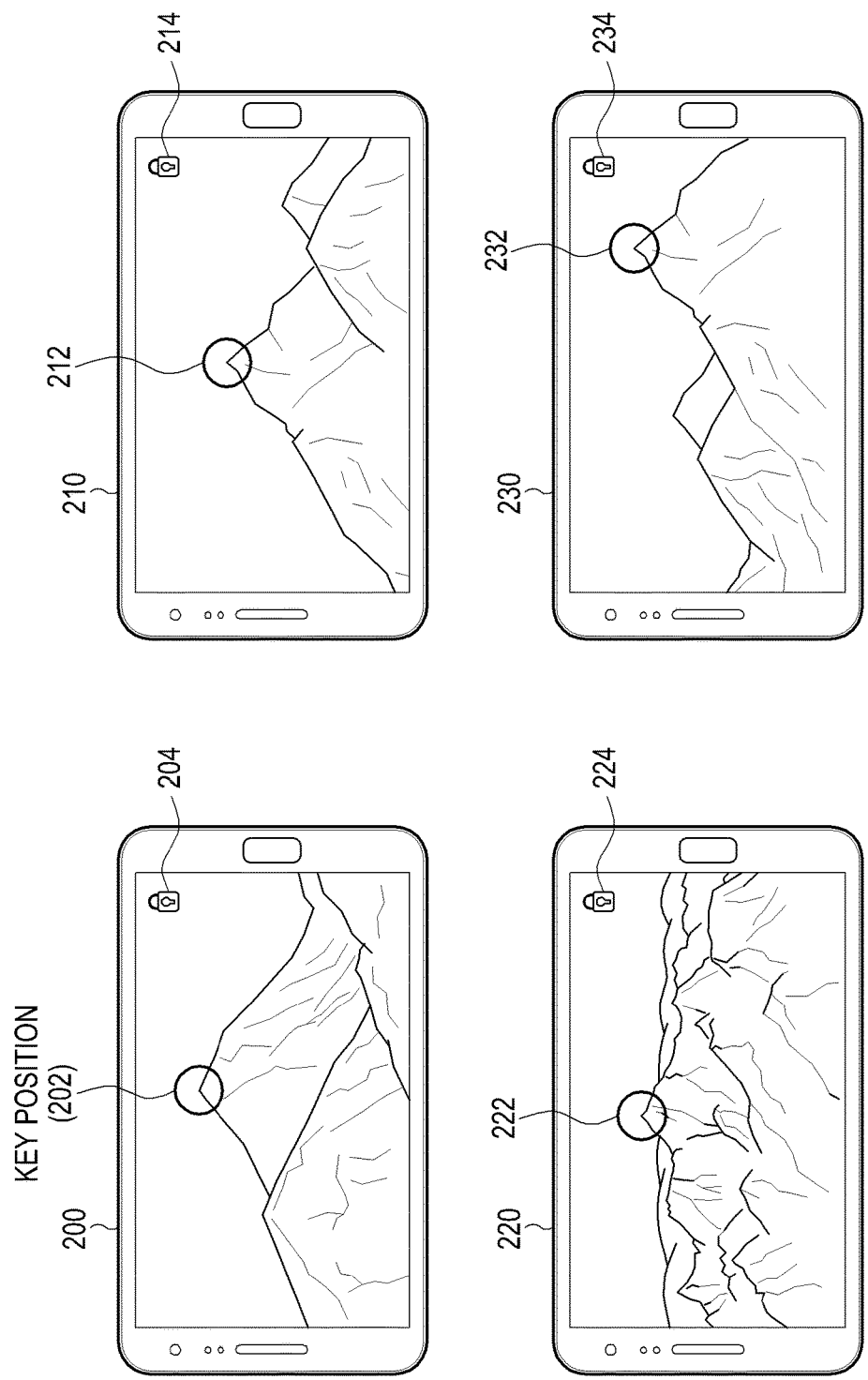
FIG. 2A is a diagram illustrating examples of images included in an image group for a lock screen according to an example embodiment of the present disclosure.

FIG. 2A is a diagram illustrating examples of images included in an image group for a lock screen according to an embodiment of the present disclosure.

Referring to FIG. 2A, an image 1 200, an image 2 210, an image 3 220, and an image 4 230 may generally include the same or similar characteristic, e.g., mountain peaks 202, 212, 222, and 232. Closed lock images 204, 214, 224, and 234 may also be displayed on the images 200 to 230, respectively, to indicate that the mobile device is currently running the locking function. Although the locked state of the mobile device is shown in the form of an icon on the lock screen image for ease of description, the locked state may also be shown with a word, e.g., "Locked" or with an icon directly set by the user. The position of the word and icon may also be varied by the user's setting and may be configured in the form of a popup window or message to overlap the lock screen image.

Figure 2B:
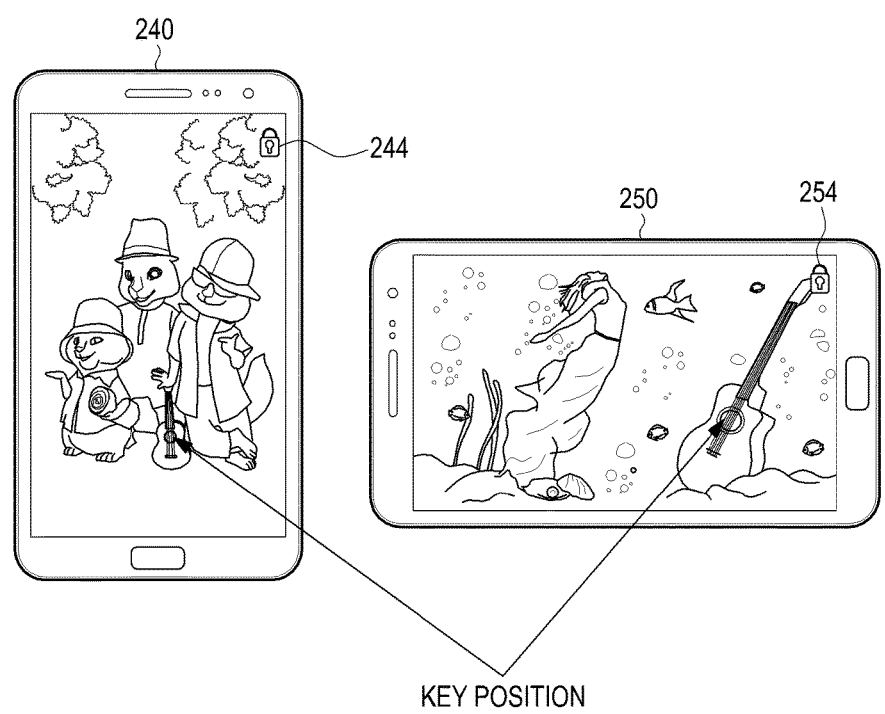
FIG. 2B is a diagram illustrating examples of images included in an image group for a lock screen according to an example embodiment of the present disclosure.

FIG. 2B is a diagram illustrating examples of images included in an image group for a lock screen according to an example embodiment of the present disclosure.

Referring to FIG. 2B, an image 1 240 and an image 2 250 include the same or similar characteristic, e.g., a guitar image. For example, the guitar image of each image is assumed to be selected as a key position corresponding to a password setting. Likewise, the image 1 240 and the image 2 250 respectively include icons 244 and 254 indicating that the mobile device currently stays locked, and their shape or position may be varied by the user's setting according to an example embodiment of the present disclosure.

According to an example embodiment of the present disclosure, a lock screen image displayed on the screen of the mobile device for locking may, for example, be configured to be shown as an image corresponding to the time or weather. For example, among images included in a lock screen image group including a mountain peak, images considering the current weather may be displayed. In other words, a scenery image may be applied which is mapped to a weather, such as being rainy, cloudy, or snowy. Or, the mobile device may display images of a sun rising morning, sun shining afternoon, and sun setting evening based on the current time for the images included in the lock screen image group including the mountain peak.

Figure 3A:
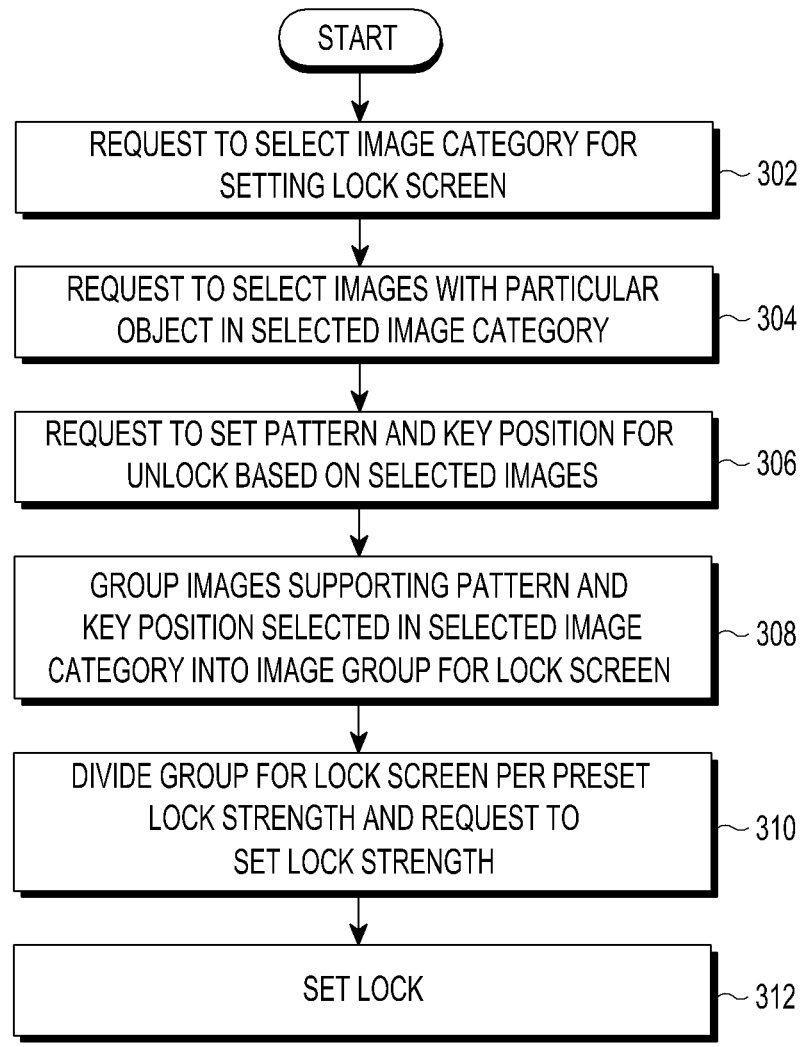
FIG. 3A is a flowchart illustrating example operations of a mobile device for locking the mobile device according to an example embodiment of the present disclosure.

FIG. 3A is a flowchart illustrating example operations of a mobile device for locking the mobile device according to an example embodiment of the present disclosure.

Referring to FIG. 3A, the user is assumed to run a menu for locking a mobile device. According to an example embodiment of the present disclosure, the locking menu may be set as default on the mobile device, or the locking menu may be provided from a server. An application or program supporting the locking menu may be downloaded from the server and may be installed and run on the mobile device.

Figure 3B:
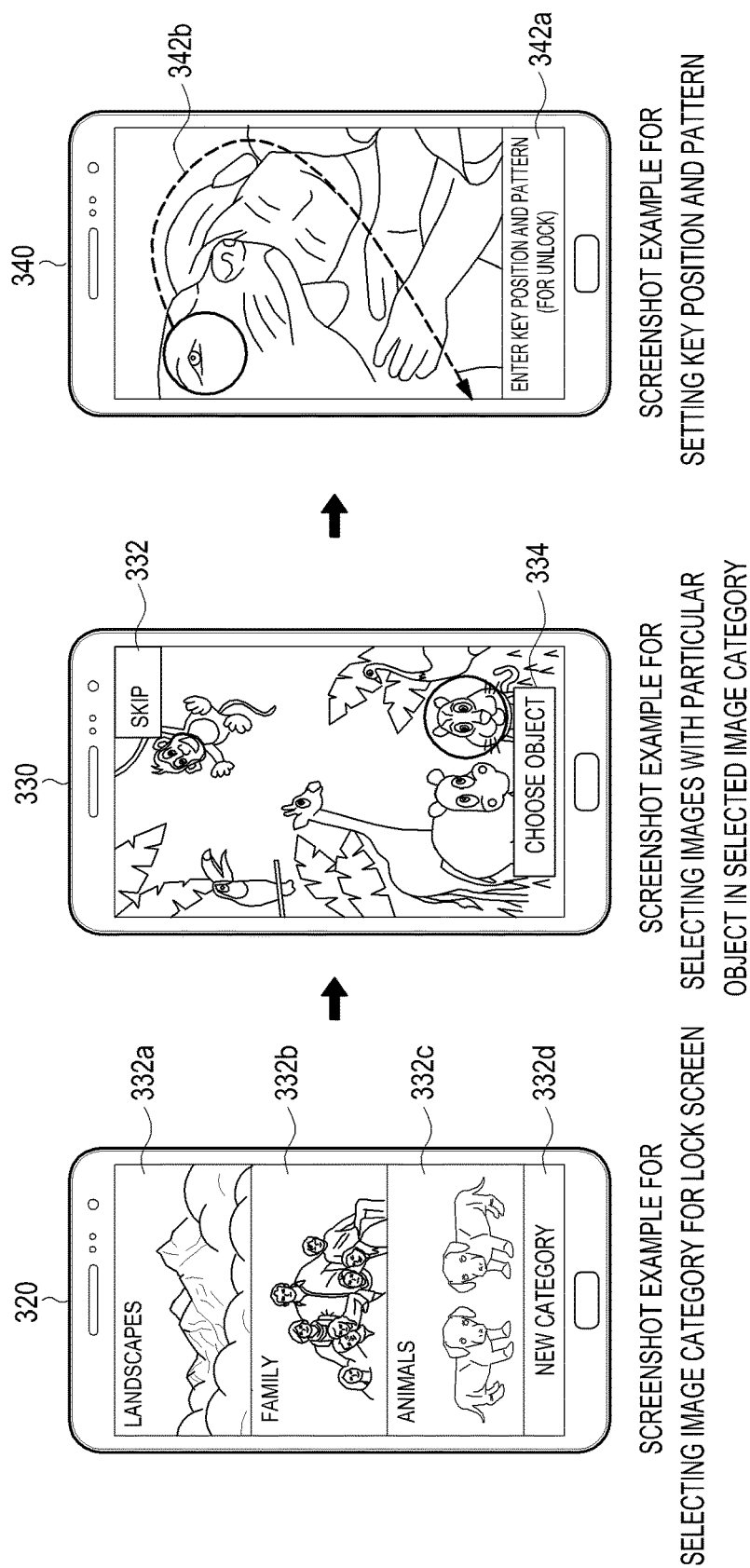
FIG. 3B is a diagram illustrating example screenshots of a mobile device corresponding to operations as illustrated in FIG. 3A according to an example embodiment of the present disclosure.

When the mobile device senses an input, e.g., a user input, corresponding to the locking menu, the mobile device displays on the screen image categories for setting a lock screen in operation 302. The mobile device requests the user to enter a user input corresponding to the selection of an image category for setting a lock screen. FIG. 3B is a diagram illustrating example screenshots of a mobile device corresponding to operations as illustrated in FIG. 3A according to an example embodiment of the present disclosure. Referring to FIG. 3B, images selectable by the user as a lock screen are displayed on the screen 320 of the mobile device. For example, the images may be listed per category of the image DB previously stored in the mobile device, e.g., landscape 332a, family 332b, and animal 332c. Or, there may be added a new category 332d for obtaining new images using the camera functionality of the mobile device or accessing a server providing the user's desired images. For such category, per-image metadata may be obtained by the above-described program, and a predetermined number of images having a common characteristic of the obtained metadata may be classified into a category. The categories may be present in a default state where they are previously classified and stored in the image DB in the mobile device. According to an example embodiment of the present disclosure, the user may obtain new images and re-obtain meta data for the new messages to configure a new category or may perform a reconfiguration or update operation for a new category for the existing images.

In operation 302, the mobile device is assumed to sense a user input corresponding to the user's selection of the animal category among the categories displayed on the screen 320. The mobile device in operation 304 may request the user to enter a user input for selecting at least one entity image to be used for setting a key of a password for unlocking in the selected category. For example, the mobile device is assumed to sense a user input corresponding to the selection of a particular entity image, e.g., a cat, among the images displayed on the screen 330 as illustrated in FIG. 3B. For example, one entity is assumed to be selected as an example. However, according to an example embodiment of the present disclosure, one or more entities may be selected from the image of the selected category, and when the strength of password setting is set, the complexity of selection of an entity on the image may be increased. An example may include when a particular portion of a particular entity in the image is selected or when a different entity is selected per image in the selected category. In this example, an entity selection window 334 requesting the user to enter a user input corresponding to the key setting may be displayed overlapping the image on which the animals are shown. Further, a skip window 332 corresponding to a user input for preventing the user from selecting the image as a lock screen image may further be displayed overlapping the images. As a result, the mobile device may sense the selection of images having a particular entity in the selected category based on the user input entered through the skip window 332 and entity selection window 334 and may sense the individual selection of entities for a key setting per image in the selected category.

In operation 306, the mobile device may request to set a password or key position and pattern for unlocking based on the selected images. For example, a window 342a requesting the user to enter a user input corresponding to a key position and pattern for setting a password for unlocking, along with an image for setting the password, is displayed on the screen 340 of FIG. 3b. The screen 340 is an example of sensing a user input for selecting, as the key position, e.g., an eye of the cat from an image including the cat selected in operation 304 and a user input for setting the action 342b of dragging down from the key position as the pattern. According to an example embodiment of the present disclosure, the entity itself selected in operation 304 or another portion of the entity may be set as the key position, and the pattern may also be set by an action associated with the entity or an action not associated with the entity. For example, the user, after entering a user input for selecting a portion corresponding to the key position, may enter an action corresponding to the pattern, e.g., a particular action, such as a drag or zig-zag motion, on the mobile device.

When sensing the user input for password setting through operations 304 to 306, the mobile device bundles images, which include the particular entity or key position selected in the selected category in operation 308 and support the set pattern, into a lock screen image group and stores them.

In operation 310, the mobile device may further divide the images included in the lock screen image group per lock strength and store them. The mobile device may display per-strength images and request the user to enter a user input corresponding to the selection of a lock strength. According to an example embodiment of the present disclosure, a lock strength may further be set upon setting a password for locking the mobile device, or a lock strength may further be set only in the temporarily-remaining-unlocked mode. For ease of description, an example of further setting a lock strength only in the temporarily-remaining-unlocked mode is described with reference to FIG. 3C.

FIG. 3C is a diagram illustrating example screenshots of a mobile device for setting a lock strength in a mode for temporarily remaining unlocked according to an example embodiment of the present disclosure. According to an example embodiment of the present disclosure, in order to set a temporarily-remaining-unlocked mode, a lock strength is set after setting a key position and pattern for locking in a lock screen image group stored through operations 302 to 308 of FIG. 3A.

Referring to FIG. 3C, a window or message 352a requesting the user to enter a user input corresponding to the lock strength setting, along with an image having the key position 352b and pattern set, is displayed on the screen 350.

Although not illustrated in FIG. 3A, when sensing a user input corresponding to the lock strength setting, the mobile device may display images respectively for predetermined strengths in the lock screen image group as illustrated on the screen 360 of FIG. 3C. Illustrated here is an example where the lock strength is set to three levels, e.g., low, medium, and high. As an example, when the lock strength is low 364, an image where the cat is highlighted, which relatively corresponds to the key position, is displayed on the screen 360. When the lock strength is medium 366, an image including a similar animal is displayed on the screen 360. When the lock strength is high 368, an image including multiple entities as well as a similar animal is displayed on the screen 360.

Displayed on the screen 370 of FIG. 3C are images categorized per strength along with a skip window 372 for identifying images after categorizing per strength and a message or window 374 requesting a user input corresponding to an image for setting the temporarily-remaining-unlocked mode among the images. The screen 370 illustrates an example in which the user senses a user input for selection of an image corresponding to the 'medium' strength.

When the password setting for locking the mobile device is complete through operations 302 to 310, the lock is completely set and run in operation 312.

Figure 4A:
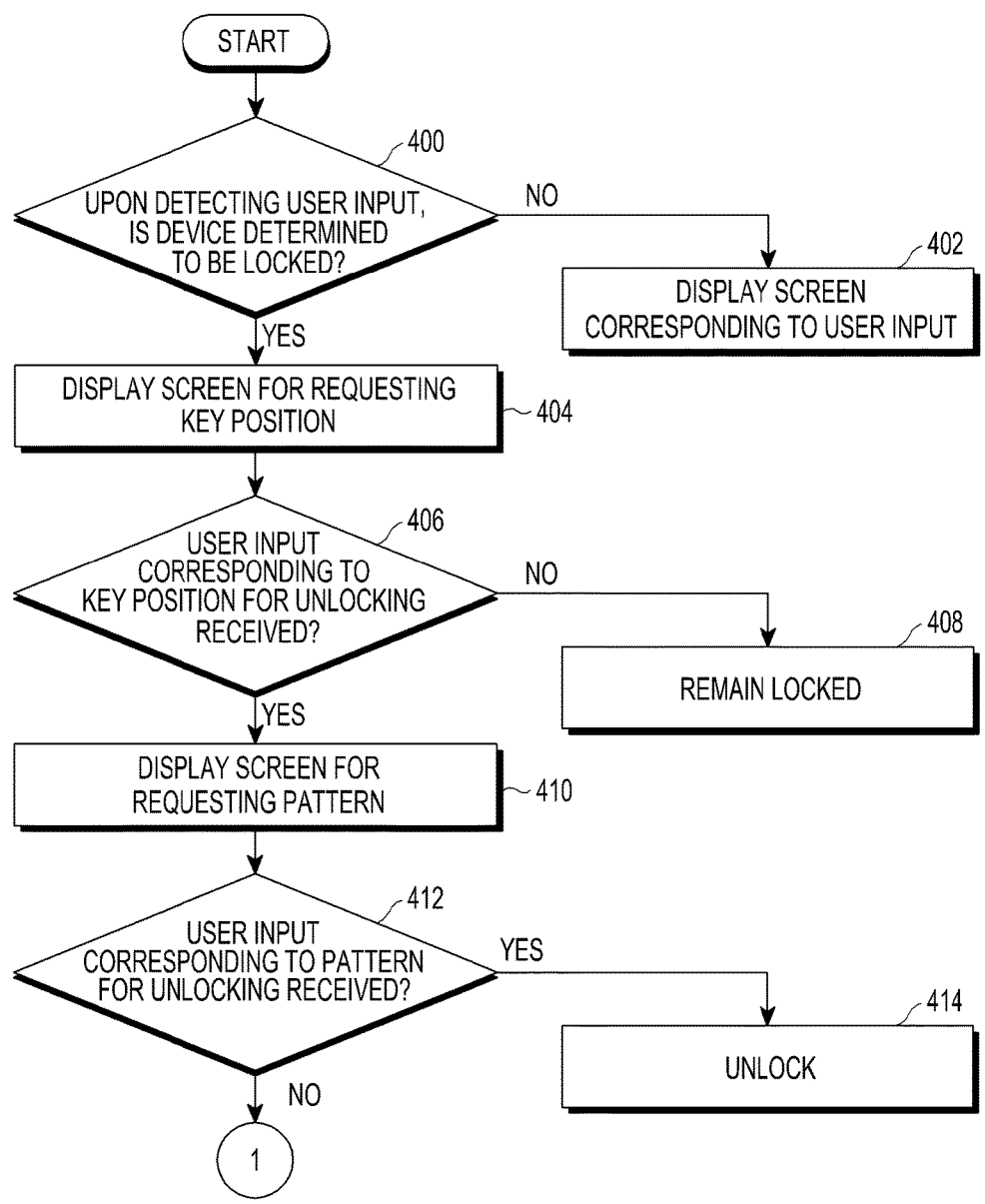
FIGS. 4A and 4B are flowcharts illustrating example operations of a mobile device for unlocking a mobile device unlocked by operations as illustrated in FIG. 3A or switching into a mode for temporarily remaining unlocked, according to an example embodiment of the present disclosure.
Figure 4B:
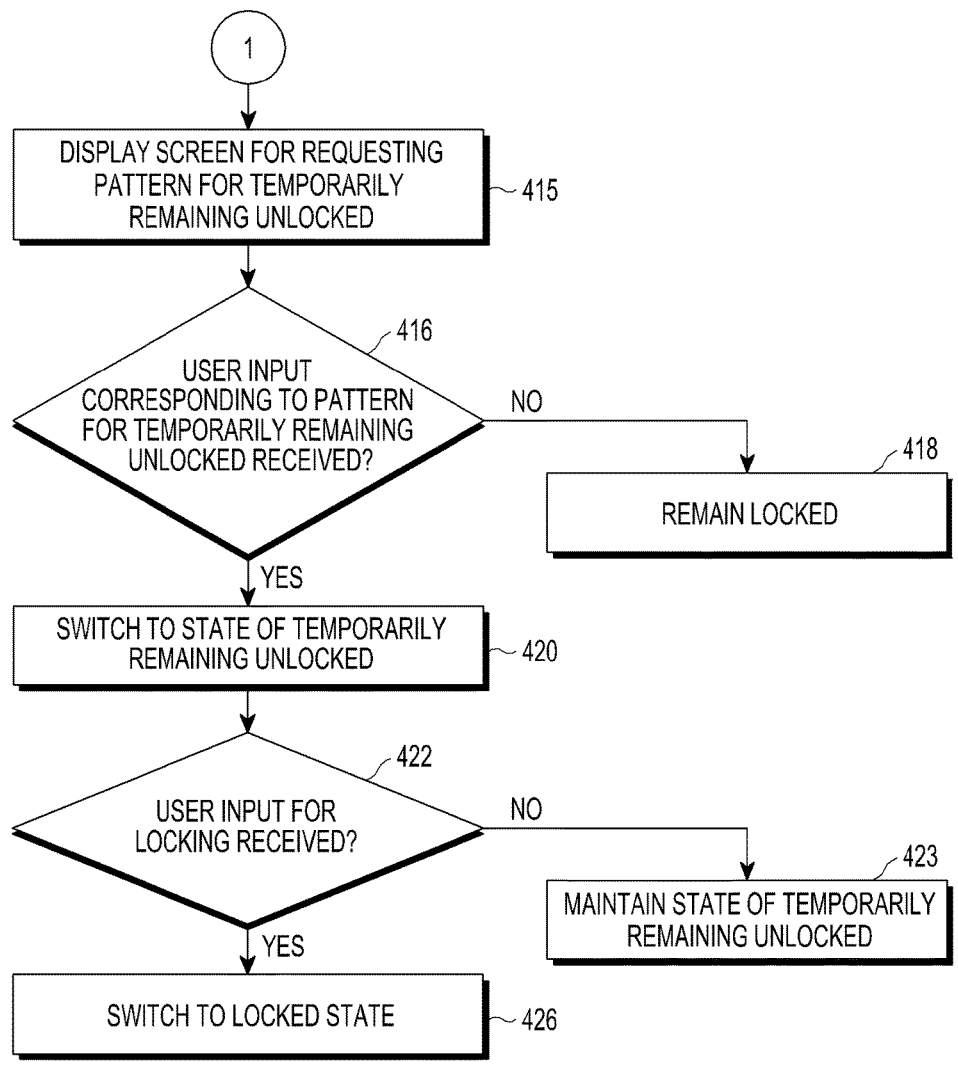

FIGS. 4A and 4B are flowcharts illustrating example operations of a mobile device for unlocking a mobile device unlocked by operations as illustrated in FIG. 3A or switching into a mode for temporarily remaining unlocked, according to an example embodiment of the present disclosure.

Referring to FIG. 4A, the mobile device is assumed to be in the state where the lock has been set by the operations of FIG. 3A. When the mobile device senses a user input on the screen, the mobile device determines whether the mobile device is locked in operation 400. When the mobile device is determined to be not locked, the mobile device goes to operation 402 to display a screen corresponding to the user input.

Figure 4C:
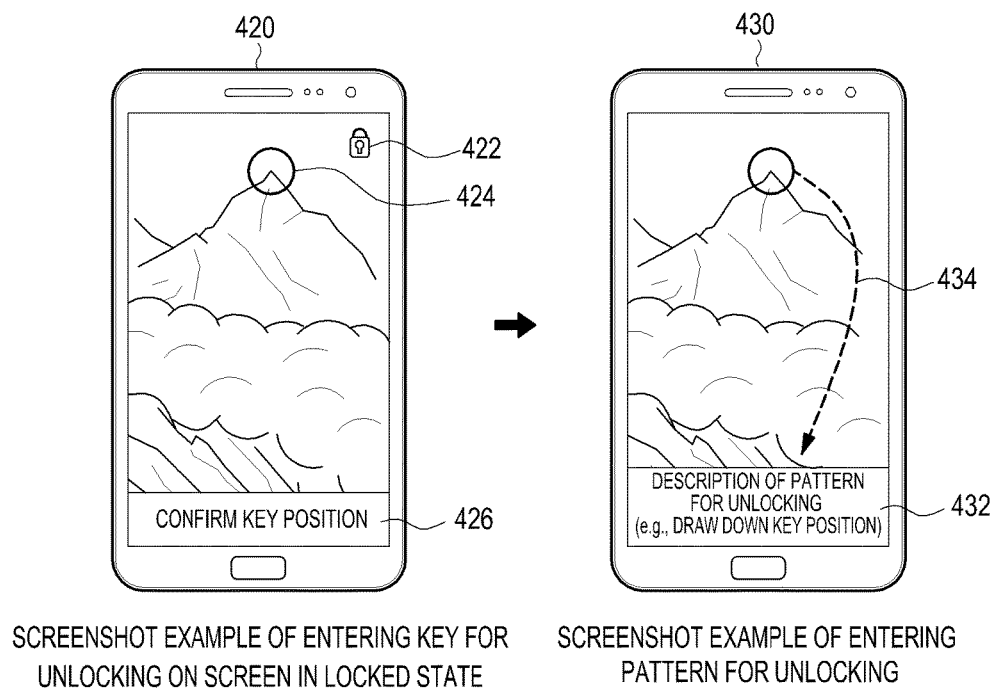

When the mobile device is determined to be locked, the mobile device goes to operation 404 to display a screen requesting a key position for unlocking the mobile device. FIGS. 4C and 4D are diagrams illustrating example screenshots of a mobile device corresponding to operations as illustrated in FIGS. 4A and 4B according to an example embodiment of the present disclosure. Referring to FIG. 4C, one of the images included in the lock screen image group stored in operation 310, along with a window or message 426 requesting a key position for unlocking, is displayed on the screen 420 in any order. In this example, an icon 422 indicating that the mobile device currently stays locked may also displayed on the screen 420.

In operation 406, the mobile device determines whether a user input is detected which corresponds to a preset key position in the image displayed on the screen. For example, the mobile device determines whether the sensed user input is entered as an image 424 corresponding to a mountain peak on the screen 420 of FIG. 4C. When the user input corresponding to the key position is determined to be not detected, the mobile device remains locked in operation 408. Although not illustrated in the drawings, upon sensing a new user input in the locked state, the mobile device in operation 404 may display another one of the images included in the lock screen image group in any order.

When the user input corresponding to the key position is determined to be sensed, the mobile device in operation 410 displays a screen requesting a pattern for unlocking. Referring to FIG. 4C, a window or message 432 requesting a user input corresponding to a pattern for unlocking, along with the image displayed in operation 404, is displayed on the screen 430. In operation 412, the mobile device determines whether a user input corresponding to the pattern is sensed. When a user input corresponding to the pattern, e.g., a user input 434 of drawing down from the mountain peak on the image, is determined to be sensed as illustrated on the screen 430 of FIG. 4C, the mobile device goes to operation 414. In operation 414, the mobile device is unlocked.

When the user input corresponding to the pattern is determined to be not sensed, the mobile device goes to operation 415 of FIG. 4B. Referring to FIG. 4B, the mobile device in operation 415 displays a screen for temporarily remaining unlocked. Referring to FIG. 4D, an icon 442 indicating the locked state and a window or message 446 requesting a user input corresponding to a pattern for setting the temporarily-remaining-unlocked mode, along with the lock screen image, are displayed on the screen 440. In operation 416, the mobile device determines whether a predetermined user input corresponding to the pattern for temporarily remaining unlocked is received. Like in the pattern for locking, shown on the screen 440 is an example in which an action of dragging down from the mountain peak which is the key position is set as the pattern. When the user input corresponding to the pattern for temporarily remaining unlocked is determined to be not sensed, the mobile device in operation 418 remains locked.

When the user input corresponding to the pattern for temporarily remaining unlocked is determined to be sensed, the mobile device in operation 420 switches to the temporarily-remaining-unlocked state. Shown on the screen 450 of FIG. 4D is an example of switching to the temporarily-remaining-unlocked state, along with an icon indicating the temporarily-remaining-unlocked state, e.g., an open lock-shaped icon 452.

After switching to the temporarily-remaining-unlocked state, the mobile device in operation 422 determines whether a user input for locking is received. When the user input for locking is determined to be not sensed, the mobile device in operation 423 remains in the temporarily-remaining-unlocked state.

When the user input for locking is determined to be sensed, the mobile device in operation 426 switches to the locked state. Illustrated on the screen 460 of FIG. 4D is an example of sensing a user input for locking, e.g., a user input to the image 464 of the mountain peak portion corresponding to the key position.

Figure 5:
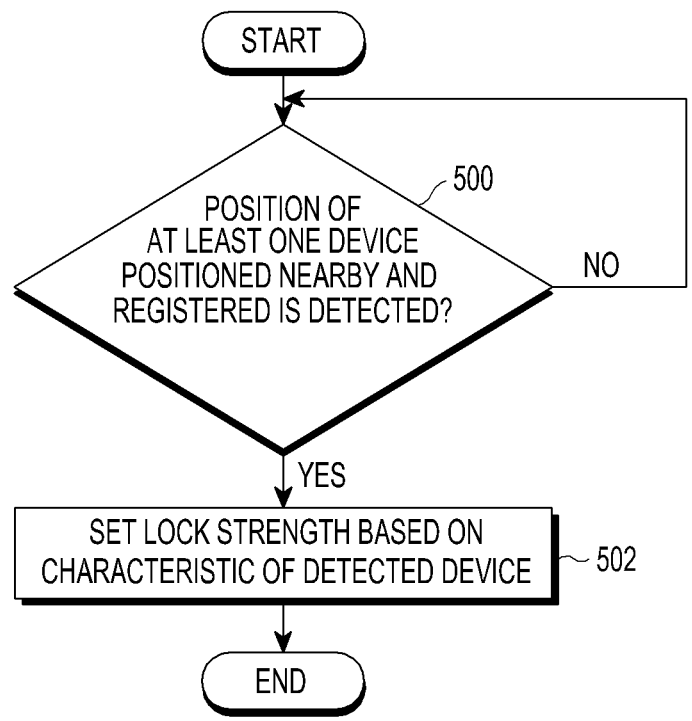
FIG. 5 is a flowchart illustrating an example operation of setting a lock strength to be applied when locking a mobile device according to an example embodiment of the present disclosure.

FIG. 5 is a flowchart illustrating an example operation of setting a lock strength to be applied when locking a mobile device according to an example embodiment of the present disclosure.

Referring to FIG. 5, the mobile device determines whether there is at least one nearby registered device in operation 500. For example, the registered device includes devices pairable with the mobile device using, e.g., Bluetooth. When at least one registered device is determined to be present, the mobile device in operation 502 sets a lock strength based on a characteristic of the device. For example, it is assumed that a wearable device, car, and speaker are present as registered devices, and the strength level is divided into high, medium, and low. In this example, the wearable device, because of being attachable onto the user's body, may be set to the lowest strength level, e.g., "low." The speaker or car may be set to a relatively higher strength level as it is more likely to be used by another user.

Figure 6A:
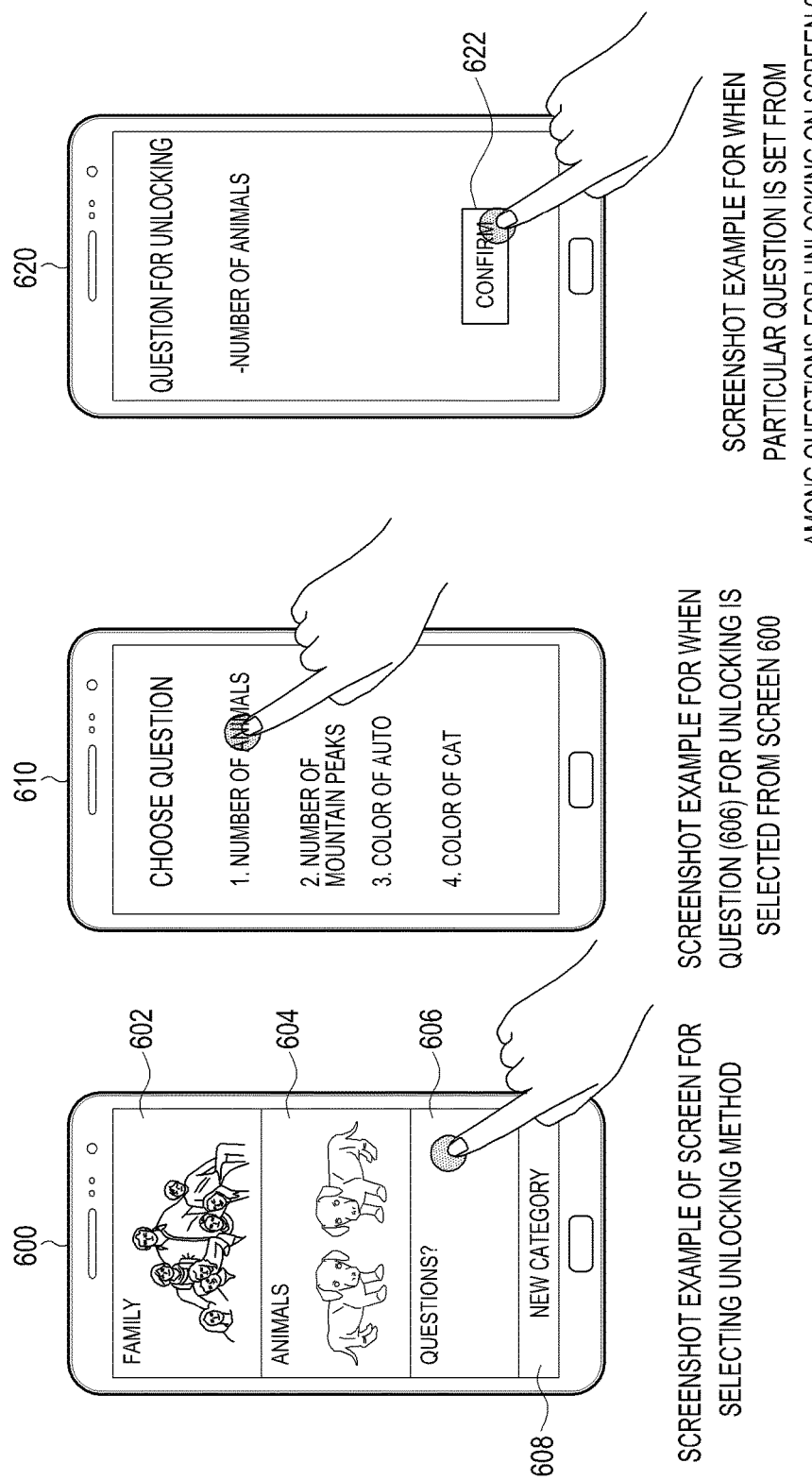
FIGS. 6A and 6B are diagrams illustrating example screenshots of a mobile device when a question is configured upon setting a password for locking according to an example embodiment of the present disclosure.
Figure 6B:
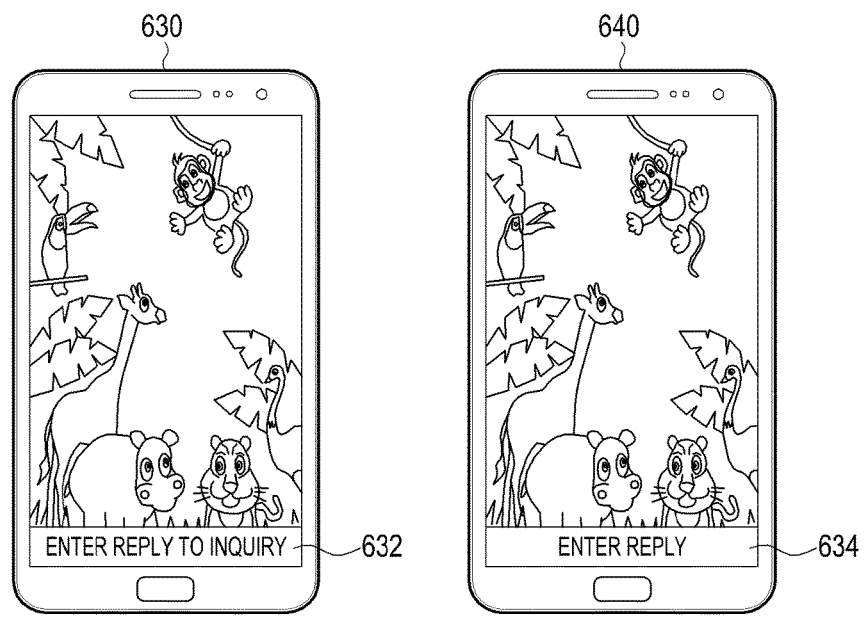

FIGS. 6A and 6B are diagrams illustrating example screenshots of a mobile device when a question is configured upon setting a password for locking according to an example embodiment of the present disclosure.

Referring to FIG. 6A, upon running a lock menu, the mobile device may include a question category 606 in addition to the new category 608 and image categories 602 and 604 stored in the image DB as illustrated on the screen 600. Upon sensing a user input corresponding to selection of the question category 606 from the user, the mobile device may display a list of preset questions through the screen 610. Although not illustrated in the drawings, the user may add new questions according to an example embodiment of the present disclosure. When sensing a user input corresponding to the selection of the question corresponding to the number of animals from the user through the screen 610, a window or message 622 requesting a user input corresponding to the setting of the question, along with the number of animals selected, may be displayed as shown on the screen 620.

Thereafter, when sensing the user input to identify the locking as illustrated in FIG. 4A, the mobile device displays one of the images stored in the lock screen image group in any order as illustrated on the screen 630 of FIG. 6B while displaying a window or message 632 requesting a user input corresponding to an answer to the question set for unlocking along with the image. Displayed on the screen 640 is a window or message 634 where a user input corresponding to an answer to the question previously set through the screens of FIG. 6A, e.g., the question for the number of animals, where the answer is the number (e.g., 6) of animals present in the image, has been entered.

Figure 7:
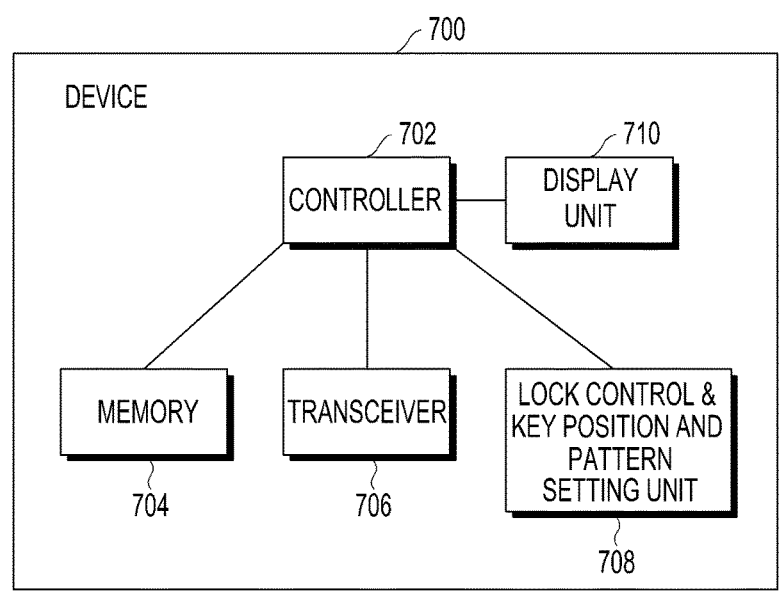
FIG. 7 is a block diagram illustrating an example configuration of a mobile device according to an example embodiment of the present disclosure.

FIG. 7 is a block diagram illustrating an example configuration of a mobile device according to an example embodiment of the present disclosure.

Referring to FIG. 7, the mobile device 700 includes a controller (e.g., including processing circuitry) 702, a memory 704, a transceiver (e.g., including communication circuitry) 706, a lock control and key position and pattern setting unit 708, and a display unit (e.g., including a display) 710. The configuration of the mobile device 700 is merely an example, and the components in the mobile device 700 may be divided into sub units or integrated into a single unit according to an example embodiment of the present disclosure or depending on the user's intention. According to an example embodiment of the present disclosure, the controller 702 of the mobile device 700 controls each of the memory 704, the transceiver 706, the lock control and key position and pattern setting unit 708, and the display 710 to perform locking corresponding to the above-described operations of FIG. 3A and unlocking or setting a temporarily-remaining-unlocked state corresponding to the operations of FIGS. 4A and 4B. The memory 704, the transceiver 706, the lock control and key position and pattern setting unit 708, and the display 710 are operated according to instructions of the controller 702. For example, the display 701 displays screens as shown in FIGS. 3B and 3C and FIGS. 4C and 4D according to an instruction of the controller 702. The memory 704 stores a lock screen image group configured according to an embodiment of the present disclosure. Substantial operations of each component overlap the operations described above, and thus, no further detailed description thereof is given.

Particular aspects of the present disclosure may be implemented as computer readable codes in a computer readable recording medium. The computer readable recording medium may, for example, refer to a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain the present disclosure may be readily interpreted by skilled programmers in the art to which the present disclosure pertains.

The apparatuses and methods according to example embodiments of the present disclosure may be implemented in hardware (e.g., circuitry), software, or a combination of hardware and software. Such software may be recorded in volatile or non-volatile storage devices, such as ROMs, memories, such as RAMs, memory chips, memory devices, or integrated circuit devices, compact disks (CDs), DVDs, magnetic disks, magnetic tapes, or other optical or magnetic storage devices while retained in machine (e.g., computer)-readable storage media. The methods according to embodiments of the present disclosure may be implemented by a computer or a portable terminal including a controller and a memory, and the memory may be an example of a machine-readable storage medium that may properly retain program(s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to example embodiments of the present disclosure may receive the program from a program providing device wiredly or wirelessly connected thereto and store the same. The program providing apparatus may include a memory for storing a program including instructions enabling a program processing apparatus to perform a method according to an example embodiment of the present disclosure and data necessary for a method according to an example embodiment of the present disclosure, a communication unit for performing wired or wireless communication with a graphic processing apparatus, and a controller transmitting the program to the graphic processing apparatus automatically or as requested by the graphic processing apparatus.

Although various example embodiments of the present disclosure have been described above, various changes may be made thereto without departing from the scope of the present disclosure. Thus, the scope of the present disclosure should not be limited to the above-described example embodiments, and should rather be defined by the following claims and equivalents thereof.

What is claimed is:

1. A method for unlocking a device, the method comprising:
   - identifying whether the device is locked when an input is detected through a display of the device;
   - displaying a first image of a plurality of images in response to identifying that the device is locked, the plurality of images corresponding to a lock state of the device and including at least one common feature;
   - identifying whether a first input corresponding to a first password for unlocking the device is detected; and
   - unlocking the device in response to identifying that the first input corresponding to the first password is detected;
   - wherein the first password is associated with the at least one common feature included in the plurality of images.

2. The method of claim 1, wherein the plurality of images are downloaded from a server or obtained from a memory of the device.

3. The method of claim 1, wherein the first password includes at least one of a position of a key corresponding to the at least one common feature and a pattern for unlocking.

4. The method of claim 1, wherein the plurality of images comprise a plurality of divided categories grouped based on locking strength.

5. The method of claim 1, further comprising:
   - identifying that a second input corresponding to a second password for temporarily keeping the device unlocked is detected; and
   - temporarily keeping the device unlocked for a specific period in response to identifying that the second input corresponding to the second password is detected,
   - wherein the second password is associated with the at least one common feature included in the plurality of images.

6. The method of claim 5, wherein the second password is different from the first password.

7. A device, the device comprising:
   - a display; and
   - a processor configured to:
     - identify whether the device is locked when an input is detected through the display,
     - display a first image of a plurality of images in response to identifying that the device is locked, the plurality of images corresponding to a lock state of the device and including at least one common feature,
     - identify whether a first input corresponding to a first password for unlocking the device is detected, and
     - unlock the device in response to identifying that the first input corresponding to the first password is detected,
     - wherein the first password is associated with the at least one common feature included in the plurality of images.

8. The device of claim 7, wherein the plurality of images are downloaded from a server or obtained from a memory of the device.

9. The device of claim 7, wherein the first password includes at least one of a position of a key corresponding to the at least one common feature and a pattern for unlocking.

10. The device of claim 7, wherein the plurality of images comprise a plurality of divided categories grouped based on locking strength.

11. The device of claim 7, wherein the processor is further configured to:
    - identify that a second input corresponding to a second password for temporarily keeping the device unlocked is detected, and
    - temporarily keep the device unlocked for a specific period in response to identifying that the second input corresponding to the second password is detected,
    - wherein the second password is associated with the at least one common feature included in the plurality of images.

12. The device of claim 11, wherein the second password is different from the first password.

* * * * *